United States Patent [19]

Kozawa

[11] 4,379,817

[45] Apr. 12, 1983

[54] ORGANIC SOLVENT-TREATED MANGANESE DIOXIDE-CONTAINING CATHODES

[75] Inventor: Akiya Kozawa, Middleburg Heights, Ohio

[73] Assignee: Union Carbide Corporation, Danbury, Conn.

[21] Appl. No.: 335,441

[22] Filed: Dec. 29, 1981

Related U.S. Application Data

[63] Continuation of Ser. No. 135,776, Mar. 31, 1980, abandoned.

[51] Int. Cl.$^3$ .............................................. H01M 4/02
[52] U.S. Cl. .................................... 429/224; 429/194
[58] Field of Search ....................... 429/224, 194, 197; 423/605; 427/126.3, 377

[56] References Cited

U.S. PATENT DOCUMENTS

| 4,133,856 | 1/1979 | Ikeda et al. ..................... 429/224 X |
| 4,197,366 | 4/1980 | Tamura et al. ................. 429/224 X |
| 4,216,247 | 8/1980 | Ikeda et al. ..................... 429/224 X |

FOREIGN PATENT DOCUMENTS

| 51-2934 | 1/1976 | Japan . |
| 52-62625 | 5/1977 | Japan . |
| 52-73328 | 6/1977 | Japan . |
| 1199426 | 7/1970 | United Kingdom . |

OTHER PUBLICATIONS

Japanese Application (Abstract), J5 4046–341, 1977.

*Primary Examiner*—Anthony Skapars
*Attorney, Agent, or Firm*—Cornelius F. O'Brien

[57] ABSTRACT

A manganese dioxide-containing cathode comprising heat-treated manganese dioxide, a binder and a conductive agent and wherein the walls of the pores of the cathode are coated with a vapor deposited organic solvent thereby reducing its affinity for absorbing moisture when exposed to a moisture environment for a fixed time period. The invention also relates to a method for producing the organic solvent treated manganese dioxide-containing cathode.

8 Claims, No Drawings

ORGANIC SOLVENT-TREATED MANGANESE DIOXIDE-CONTAINING CATHODES

This application is a continuation of our prior U.S. application Ser. No. 135,776 filed Mar. 31, 1980, now abandoned.

FIELD OF THE INVENTION

The invention relates to a manganese dioxide cathode for use in electrochemical cells in which the cathode contains heat-treated manganese dioxide, a conductive agent and a binder and wherein the walls of the surface pores of the manganese dioxide are coated with a vapor deposited organic solvent so as to minimize moisture reabsorption by the manganese dioxide when exposed to a moisture environment for a fixed time period. The invention also relates to a method for producing the manganese dioxide cathode.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as manganese dioxide. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or $\gamma$-butyrolactone. The term "Periodic Table" as used herein refers to the Periodic Table of the Elements as set forth on the inside back cover of the Handbook of Chemistry and Physics, 48th Edition, the Chemical Rubber Co., Cleveland, Ohio, 1967–1968.

Although manganese dioxide has been mentioned as a cathode for cell applications, manganese dioxide inherently contains an unacceptable amount of water, both of the absorbed and bound (adsorbed) types, which is sufficient to cause anode (lithium) corrosion along with its associated hydrogen evolution. This type of corrosion that causes gas evolution is a serious problem in sealed cells, particularly in miniature type button cells. In order to maintain overall battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. Thus it is important that the physical dimensions of the cell's housing remain constant during discharge and that the cell will not leak any electrolyte into the device being powered.

U.S. Pat. No. 4,133,856 discloses a process for producing an $MnO_2$ electrode (cathode) for nonaqueous cells whereby the $MnO_2$ is initially heated within a range of 350° C. to 430° C. so as to substantially remove both the absorbed and bound water and then, after being formed into an electrode with a conductive agent and binder, it is further heated in a range of 200° C. to 350° C. prior to its assembly into a cell. British Patent 1,199,426 also discloses the heat treatment of $MnO_2$ in air at 250° C. to 450° C. to substantially remove its water component.

U.S. Pat. No. 4,285,122 issued on Aug. 25, 1981 in the name of applicant, A. Kozawa, discloses a process whereby a homogeneous mass of particulate manganese dioxide is heat-treated and then contacted with an organic solvent that substantially fills the pores of the manganese dioxide with a layer of the organic solvent which effectively decreases the affinity or propensity of the manganese dioxide for reabsorbing moisture. The disclosure made in this United States patent is incorporated herein by reference.

It is an object of the present invention to provide a cathode employing manganese dioxide, a conductive agent and a binder that will have a reduced capacity for moisture absorption when exposed to a moisture environment for a fixed time period.

It is another object of the present invention to provide a manganese dioxide-containing cathode that has the walls of the pores of the manganese dioxide substantially coated with an organic solvent.

It is another object of the present invention to provide a treatment for heat-treated manganese dioxide cathode pellets so as to decrease the affinity or propensity of the cathode for absorbing moisture.

It is another object of the present invention to provide a method for producing a manganese dioxide-containing cathode having a reduced propensity for absorbing moisture.

The foregoing and additional objects will become more fully apparent from the following description.

SUMMARY OF THE INVENTION

The invention relates to a manganese dioxide-containing cathode for use in nonaqueous cells comprising heat treated manganese dioxide, a conductive agent and a binder; the improvement wherein the walls of at least the surface pores of the manganese dioxide-containing cathode are substantially coated with a vapor deposited organic solvent to reduce the affinity of the manganese dioxide-containing cathode for reabsorbing moisture.

The invention also relates to a method for producing manganese dioxide-containing cathodes for use in nonaqueous cell systems comprising the steps:

(a) heat treating manganese dioxide at between about 200° C. and about 430° C. for a period sufficient to reduce the moisture content to less than 400 parts per million;

(b) blending the heat treated manganese dioxide with a conductive agent and a binder to form a manganese dioxide-containing cathode; and (c) contacting the manganese dioxide-containing cathode of step (b) with a vapor of an organic solvent so as to substantially deposit a layer of the organic solvent on the walls of at least the surface pores of the manganese dioxide-containing cathode.

Preferably after step (b) and before step (c) the manganese dioxide-containing cathode should be heated to remove some or all of the moisture it reabsorbed during the blending step. This could be accomplished by heating the cathode at a temperature of 50° C. or above for a suitable amount of time.

The manganese dioxide-containing cathode so treated or formed should be able to be exposed to a relative humidity of 8% at 20° C. for about 30 minutes without having the moisture content increase to a total of no more than about 700 parts per million and preferably to a total of no more than about 500 parts per million.

Manganese dioxide suitable for use in this invention could be manganese dioxide having a majority (over 85% of its particles sized about 100 microns or lower. This will effectively provide an overall large surface area (usually 40 to 50 $m^2/g$) over which the organic solvent can be deposited for substantially coating at least the walls of the surface pores in the manganese dioxide. By having the majority of the walls of the surface pores substantially filled with an organic solvent, a manganese dioxide-containing cathode can be handled and transported in a moisture-containing environment for a limited time period whereupon moisture reabsorption will be greatly reduced over untreated manganese dioxide. This will facilitate the assembly of the organic solvent-treated manganese dioxide-containing cathode into cells without the need for expensive and cumbersome moisture-free equipment.

The moisture in conventional grades of particulate manganese dioxide is usually above 15,000 parts per million and can be substantially removed by heating it to an elevated temperature for a period of time sufficient to drive off the moisture. For example, particulate manganese dioxide can be heated at between about 200° C. and 430° C. for a period between about 3 hours and about 9 hours to reduce its moisture content to less than about 300 parts per million. Alternately, the particulate manganese dioxide can be subjected to a vacuum at an elevated temperature whereupon the moisture could be withdrawn to the level recited above. It has been observed that when heat-treated particulate manganese dioxide is exposed to a relative humidity of 8% at 20° C. for 30 minutes, the moisture content increases to above 1300 parts per million.

The organic solvent suitable for use in this invention should have a relatively low vapor pressure, i.e., a relatively high boiling point such that the solvent will remain in the capillary spaces or walls of the pores in the manganese dioxide-containing cathode and any moisture reabsorbed will be restricted to only the superficial surface of the cathode. The organic solvent could be a single solvent such as γ-butyrolactone (GBL), propylene carbonate (PC), dimethoxyethane (DME), tetrahydrofuran (THF), 3-methyl-2-oxazolidone (3Me20x), or the like, or mixtures and combinations of solvents. When the treated manganese dioxide-containing cathode is intended for use in a particular cell system, then it is within the scope of this invention to use the organic electrolyte solution as the organic solvent. Thus an organic electrolyte could be employed to substantially coat the walls of the surface pores of the manganese dioxide-containing cathode to produce a moisture-reduced cathode for nonaqueous cell applications. Generally, the heat treated manganese dioxide will have a bulk density of about 1.5 grams per cubic centimeter or less. This manganese dioxide can be blended with a suitable binder and conductive agent and after being compacted into a pellet, it can be treated with an organic solvent, whereupon the bulk density increases to about 35 to 50 grams per cubic inch (2.1 to 3.1 grams per cubic centimeter) while insuring that the porosity is sufficient to permit the cell's electrolyte to permeate through the electrode. Preferably the finished electrode should have a porosity with between about 20 to 40 percent interconnected voids for providing increased access for the electrolyte.

The conductive agent to be employed could comprise carbon and/or graphite. To impart cohesive characteristics to the electrode, a suitable binder material, with or without plasticizers and with or without stabilizers, has to be added. Suitable binder materials may include Portland cement, or resins such as polyvinyl, polyethylene, polypropylene, polyacrylics, polystyrene, polyisobutylene and the like with polytetrafluoroethylene being the preferred. Preferably the binder can vary between about 1% and about 8% by weight of the finished electrode.

The manganese dioxide-containing cathode of this invention can be fabricated by heating particulate manganese dioxide at 350° C. in air for 8 hours to reduce its moisture content to less than about 300 parts per million. Thereafter the heat-treated manganese dioxide is mixed with a conductive agent (carbon) and a binder and preferably reheated to about 70° C. for 30 minutes to remove moisture that may have been reabsorbed by the manganese dioxide. The manganese dioxide/carbon/binder mixture is compacted and then contacted with a vapor of organic solvent which will coat at least the walls of the surface pores of the compacted body. The solvent-treated, moisture-reduced manganese dioxide-containing cathode so produced will be admirably suited for nonaqueous cell systems. The organic vapor can be deposited on the walls of at least the surface pores and cavities of the manganese dioxide-containing cathode preferably at elevated temperatures (50° C. to 80° C.).

What is claimed is:

1. A manganese dioxide for use as a cathode of a non-aqueous cell wherein at least the walls of the pores of the manganese dioxide exposed on the cathode surface are substantially coated with a vapor deposited organic solvent so as to reduce the affinity of the manganese dioxide for absorbing moisture.

2. The manganese dioxide of claim 1 wherein the organic solvent is selected from the group consisting of γ-butyrolactone, propylene carbonate, dimethoxyethane, tetrahydrofuran, and 3-methyl-2-oxazolidone.

3. The manganese dioxide of claim 1 wherein the organic solvent is an organic electrolyte solution.

4. The manganese dioxide of claim 1 wherein a conductive agent and a binder are added.

5. The manganese dioxide of claim 4 wherein the conductive agent is carbon or graphite.

6. The manganese dioxide of claim 4 wherein the binder is selected from the group consisting of Portland cement, polyvinyl, polyethylene, polypropylene, polyacrylics, polystyrene, polyisobutylene and polytetrafluoroethylene.

7. The manganese dioxide of claim 4 wherein when the manganese dioxide is exposed to a relative humidity of 8% at 20° C. for about 30 minutes, the manganese dioxide will have a total of no more than about 700 parts per million moisture.

8. The manganese dioxide of claim 7 wherein the manganese dioxide will have a total of no more than 500 parts per million moisture.

* * * * *